Dec. 31, 1957   J. G. BARAN   2,818,235
RELEASABLE LATCH SUPPORT FOR PANEL CEILING
Filed Aug. 18, 1953   2 Sheets-Sheet 1
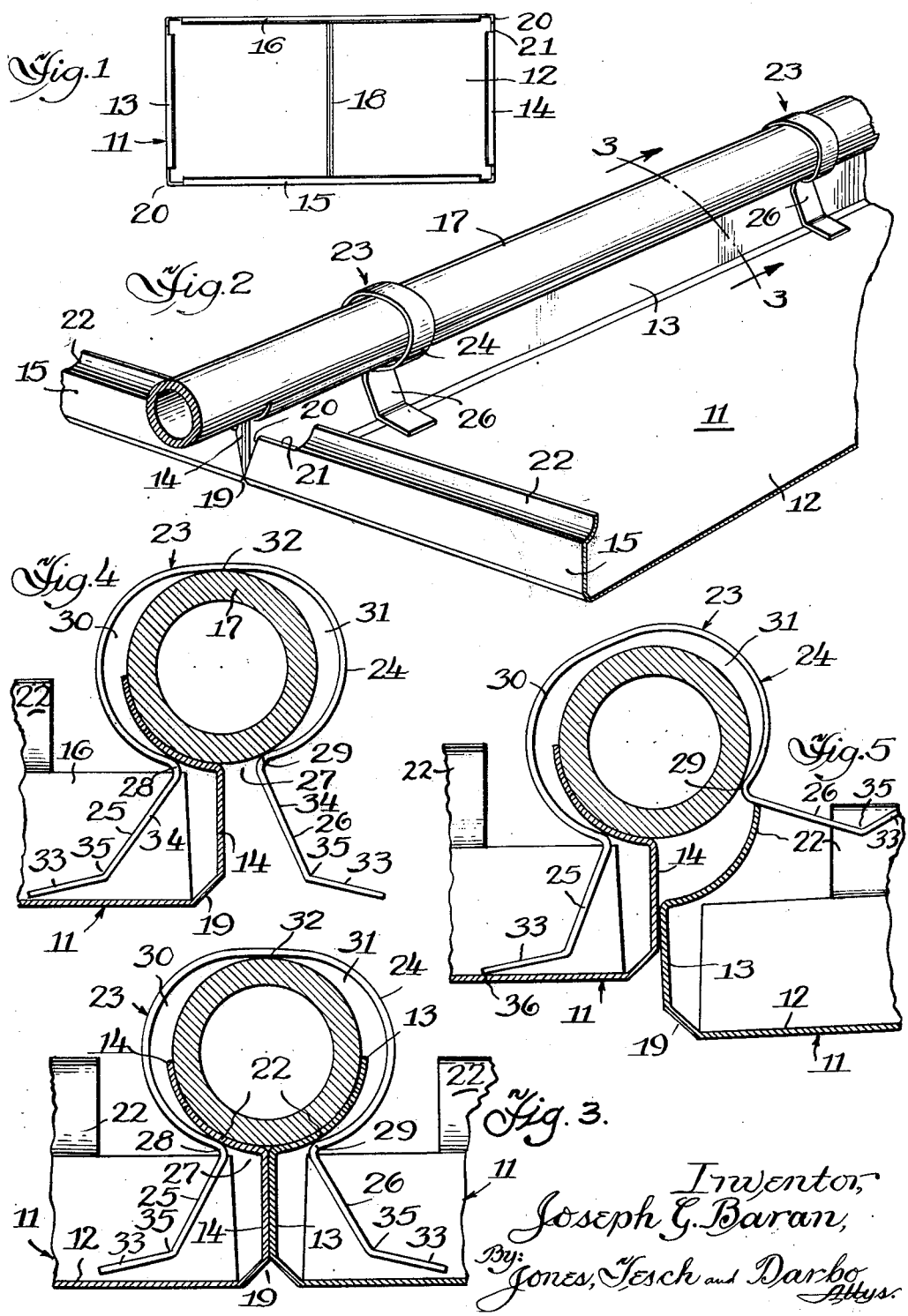
Inventor,
Joseph G. Baran,
By: Jones, Jesch and Darbo
Attys.

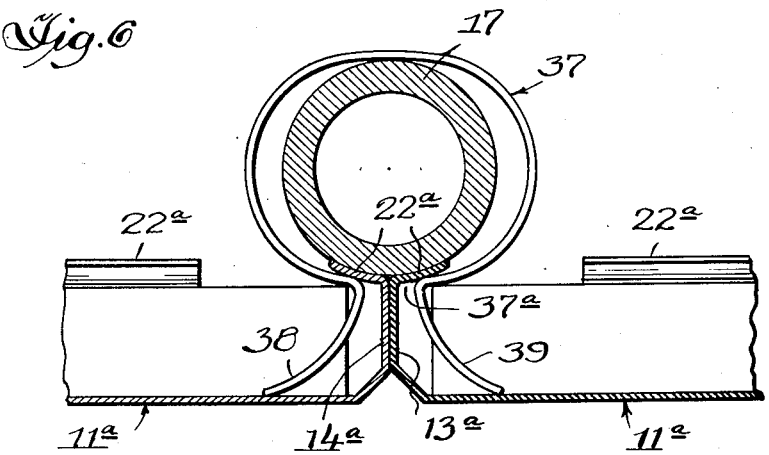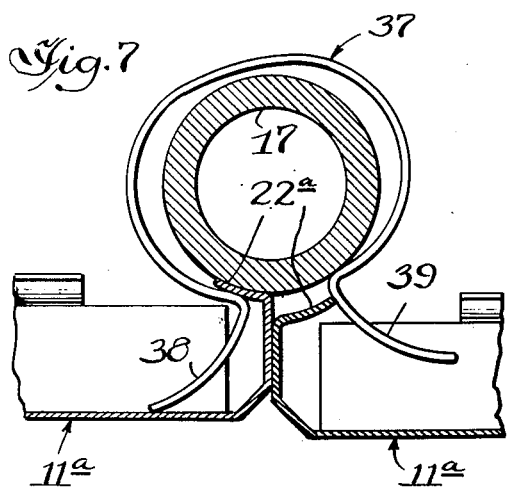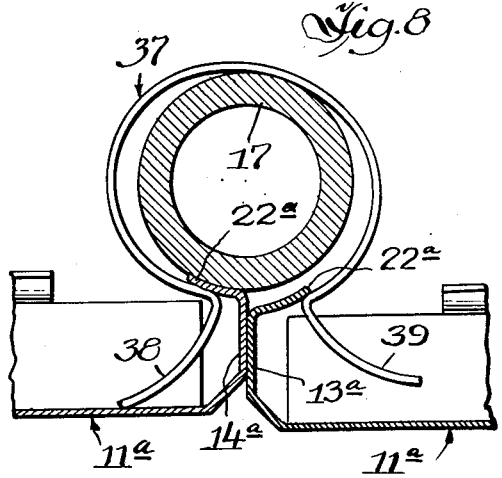

United States Patent Office 2,818,235
Patented Dec. 31, 1957

2,818,235

RELEASABLE LATCH SUPPORT FOR PANEL CEILING

Joseph G. Baran, Chicago, Ill., assignor to Burgess-Manning Company, Libertyville, Ill., a corporation of Illinois Application August 18, 1953, Serial No. 374,866

4 Claims. (Cl. 257—124)

This invention relates to a releasable latch support for panel ceilings such as are used for heating rooms by what has come to be known as panel heating or radiant heating systems and which are also at times usable for cooling purposes.

Such panel ceilings have preformed metal pans supported from ceiling pipes that carry the heating or cooling fluid, the support means providing also for transfer of heat from the pipe to the pan. One problem in the commercial development of such heating systems has been the difficulty of installation of contiguous pans on the pipe support and the removal of one pan, if desired for any purpose, without disturbing an adjoining pan.

The present invention is directed to releasable latch support means for the ceiling pans providing ease of installation and removal while affording proper heat conductivity efficiency, and simplicity and security of the ceiling structure.

These and other objects and advantages will be apparent from the following description, taken together with the accompanying drawings, of illustrative embodiments of the invention, and in which drawings Figure 1 is a plan view of a ceiling panel or pan constructed in accordance with the present invention;

Figure 2 is an enlarged perspective view of a pipe support and contiguous pans (partly broken away) with releasable latch means following the present invention;

Figure 3 is a further enlarged cross-section taken on the line 3—3 of Figure 2;

Figure 4 is a view somewhat similar to Figure 3 but with one of the pans omitted, either as before assembly or after removal;

Figure 5 is a somewhat similar view showing a pan in one stage of the assembly operation;

Figure 6 is a view similar to Figure 3 of a modified form of pan and clip;

Figure 7 is a view, somewhat similar to Figure 5, of the clip of Figure 6 and one of the contiguous pans in one stage of the assembly operation, and Figure 8 is a view showing one stage in the operation of removing a pan.

The ceiling panel or pan 11 here shown, preferably fabricated from sheet metal such as aluminum having high heat conductivity, has a broad, flat surface 12 and upstanding marginal flanges 13, 14, 15 and 16, a pair of which are used to support the pan in the ceiling structure on pipes which serve also to circulate the heating or cooling fluid. A pipe such as 17 serves both to support and to heat or cool contiguous pans.

An inverted V-groove 18 may be impressed from side to side midway between the ends of the pan to form tile-like faces for esthetic effect, and the marginal edges of the pan are also shown beveled, as at 19, so that the edges of two contiguous pans form an inverted V-groove cooperating in visual effect with the central groove 18 to carry out the tile appearance.

The flanges 13 and 14 constitute a pair by which the pans may be installed on pipes spaced apart on centers a distance equal to the length of the pan 11. The flanges 15 and 16 constitute an alternative pair by which to accommodate pipes spaced apart the width of the pan, where such closer spacing is desired. Thus the pans may be installed either on relatively closely spaced pipes or pipes spaced farther apart.

In accordance with the present invention, the pan flanges referred to each have an upper extremity or curl 22 in the form of an inwardly extending arcuate part conforming generally to the curvature of the pipe 17. This curl is limited in extent to an angle of approximately ninety degrees or somewhat less than ninety degrees, as will be explained in greater detail hereinafter. The concavity of the curl faces outwardly from the pan.

Further following the present invention, a metallic spring clip 23 is provided having a band-like clamp portion 24 and legs 25 and 26 flaring outwardly from the lower end of the clamp portion at opposite sides thereof leaving a restricted opening 27 at the juncture of said clamp portion and the legs 25 and 26 respectively, that is, the juncture 28 between the leg 25 and the clamp portion 24, and the juncture 29 between the leg 26 and the clamp portion. The junctures 28 and 29 are desirably rounded as shown to provide smooth bearing points for purposes presently explained, and the clamp portion is desirably wider than it is high, or in other words, elongated transversely to an oblong shape so as to be spaced off the pipe 17 at 30 and 31 while bearing snugly on the pipe at the top of the pipe as at 32.

In the form of a clip shown in Figs. 2 to 5 inclusive, the legs 25 and 26, respectively, are made up of two straight portions 33 and 34 having an angle 35 between them, the extremity portions 33 being substantially more flared than the portions 34.

When, now, a pan is assembled with a pipe 17 (as shown in Fig. 4) the arcuate upper extremity 22 of one of the flanges, in this instance the flange 14, is abutted against the pipe and the clip 23 is placed over the pipe by a suitable spreading action of the resilient material of the clip to bring the clip into position so that the leg 25 thereof is inside the pan and the bearing point 28 of the clip presses against the flange extremity 22 to hold this securely and snugly against the pipe, the other bearing point 29 of the clip engaging the pipe to retain the parts in this assembly.

Next, as shown in Fig. 5, when an adjoining or contiguous panel is desired to be installed adjacent that already in place and to be supported by the same pipe 17, the flange 13 of the pan to be next installed is placed in abutment with the flange 14 of the panel already assembled. The upper extremity 22 of the flange 13 is thus inserted between the flange 14 and the leg 26 of the spring clip, and, as the pan is forced upwardly, the outwardly flaring leg 26 provides a cam surface, which, upon the upward movement of the pan, causes the clip to spread apart sufficiently to permit the flange extremity 22 to enter the normally restricted opening 27 in the clip, that is, to pass by the bearing point 29 and to slip in between the clip and pipe as the clip snaps back toward its normal configuration as shown in Fig. 3.

The behavior of the clip during this operation depends upon the form and dimensions of the clip and of the curls of the panels. Because the curl is limited in arcuate extent to approximately ninety degrees or less, it forces a leg of the clip outwardly only to the point at which the edge of the curl readily slips past the bearing juncture of the clip after which it slides into its intended position in pressure engagement with the pipe. It may be noted that the minimum length of the curl is that which will extend beyond the normal position of the bearing juncture of the clip whereby the pan is supported and in thermal contact with the pipe. The full ninety degrees is preferred since the greater distortion of the clip during the assembly operation results in a more positive snap as the pan is forced into position which assures the workman that the unit is securely and properly installed.

The legs of the clips are sufficiently long to prevent more than limited rotation of the clip with respect to the pipe during assembly of a pan. Encirclement of substantially more than one hundred eighty degrees of the pipe is assured at all times whereby the clip is retained in position and does not become dislodged during assembly of a pan. Furthermore, a vertical component of incline of the clip leg adequate for the cam action described is assured.

After the action just described, the spring clip, by its inherent resilience, springs back toward its normal, constricted shape so that the bearing points 28 and 29 defining the restricted opening 27 bear tightly against the curls 22 of the contiguous flanges 13 and 14 thus securely but releasably supporting both pans. At the same time, a close contact is provided between the flanges 13 and 14, below their upper extremities 22, and between the flange curls 22 and the outer surface of the pipe, for good heat conductivity, the heat being conducted from the surface of the pipe 17 through the arcuate flange portions 22 and down through the flanges themselves to the broad surfaces 12 of the pans. Thus a direct path is provided for such conduction which minimizes heat loss.

Turning now to the release function of the present means, if, now, the parts being in their assembled condition as shown in Fig. 3, it be desired to remove or demount a pan, as for example the right-hand pan in Fig. 3, the process previously described for assembly is reversed. That is to say, when the right-hand pan in Fig. 3 is pulled downwardly by any suitable means or tool (not necessary to be here described) the curl 22 of the flange 13 provides a cam surface which spreads the clip apart by reason of the coaction between the arcuate part 22 and the bearing point 29 of the clip. The arrangement of the parts, as shown, including the lateral elongation of the clamp part 24 and the width of the opening 27 provides that a substantial lateral component of force is exerted which opens up the otherwise restricted opening 27 to permit the curl 22 to pass downwardly therethrough. When the curl 22 has passed by the bearing point 29 of the clip, the pan then takes the position shown at the right-hand side of Fig. 5 and can be easily removed, leaving the left-hand pan on the clip and the clip on the pipe. Thus a pan can be readily removed without removing a contiguous pan, and without access to the space above the pipe.

After the action just described the clip springs back to the position shown in Fig. 4 in continued support of the adjacent pan.

The clip is advantageously so formed, as shown in Figs. 2 to 5 of the drawings, that is, by the lateral elongations 30 and 31, and by the extent of the normal opening 27 of the clip, that the clamping portion 24 of the clip bears only at the points 28 and 29 against the curl 22, the point of contact being such that when either an upward push or a pull downwardly is exerted on a pan, a desirably minimum amount of force is required to spread the clip apart to enlarge the clamp opening, while, nevertheless, a security of releasable assembly of the pan with the pipe is provided that guards against accidental dislodgment or dropping of a pan.

Turning to Fig. 6, a modified form of clip 37 is here shown similar to the clip 23 but having its flaring legs 38 and 39 continuously curved in the manner and for the purposes hereinafter described. In the assembly of Fig. 6, the width of flanges 13a and 14a is reduced to a minimum to increase the rate of flow of heat between pipe and pan face. This reduction also limits the length of clip legs 38 and 39 for a given rate of flare and, in turn, the extent of the arcuate extremities 22a of the flanges since the edges thereof must be within the flare of the clip legs for assembly purposes.

Since the inwardly directed force of the spring clip increases as the legs are sprung apart in the mounting of a pan in position, it is desirable to so curve the legs that the cam surface which they provide becomes progressively more vertical from the leg extremities to the points of juncture of the legs with the band portion of the clip whereby the upward force required to push a pan into position is substantially uniform throughout the length of travel of the edge of a flange curl along the cam surface of the leg. The legs 38 and 39 are so designed. It will be seen from Fig. 7 that because the cam surface gradually approaches vertical at the upper extremity of leg 39, the final travel of the pan being installed is a smooth movement past the point at which the leg snaps home to its assembled position as shown in Fig. 6.

As indicated in Fig. 8, any pan may be removed by withdrawing it downwardly, the resulting temporary deformation of the clip tending to slide the extremity of the leg outwardly along the surface of the pan to release it and permit the curl to slip out from under the clip.

So constructed and arranged, there is here disclosed simple and improved means for installing or removing the pans without access to the space above the pipe and without disturbance of the contiguous pans. In each illustration, the pan flange extremity is of sufficiently limited arc, being approximately ninety degrees or less, so that an upward or downward movement of the flange into or out of contact with the pipe does not require spreading of the legs of the clip independently of that which occurs as a result of this movement, and does not result in dislodgment of the clip from the pipe. Any desired number of clips may be used.

Embodiments of the invention having been disclosed for purposes of exemplification thereof, it is to be understood that such changes may be made as fall within the scope of the appended claims without departing therefrom.

Invention is claimed as follows:

1. In a panel ceiling for a heat transfer system including a plurality of spaced apart fluid conducting pipes and a plurality of panels arranged in a plane underlying said pipes to form a ceiling surface, releasable latch support means for the panels comprising integral flanges disposed at opposite edges thereof, said flanges having extremities turned back inwardly over the panels and semi-cylindrically curved with outwardly facing concavity into an arc of approximately ninety degrees or less, the panels being free from structure extending outwardly from the edges thereof, and separate spring clips having generally circular clamp portions extending over the tops of the pipes and embracing the pipes and curved flange extremities to hold said extremities firmly against the pipes, said clamp portions of said clips being open at the bottoms of the pipes and having legs flaring downwardly and outwardly from the extremities of said clamp portions toward the panels, the rate of flare and the length of the legs of the clips being sufficient to carry the ends thereof beyond the vertical projections of the edges of the curved flange extremities of the contiguous panels associated with the clips.

2. Structure in accordance with claim 1 wherein the clamp portion of each clip engages other elements of the system at only three points; viz., along the top of the pipe and along the curved flange extremities near the bottom of the pipe.

3. A ceiling panel for a panel heating and cooling system comprising a flat panel having upstanding flanges at opposite edges thereof, said flanges having extremities turned back inwardly over the panels and semi-cylindrically curved with outwardly facing concavity into an arc of approximately ninety degrees or less, the semi-cylindrical surfaces of said flanges being continuous and uninterrupted throughout the lengths of said flanges, the panels being free from structure extending outwardly from the edges thereof.

4. A ceiling panel in accordance with claim 3 wherein the panel is rectangular and all four edges are provided with flanges having the defined curved extremities.

References Cited in the file of this patent

UNITED STATES PATENTS

| | | |
|---|---|---|
| 588,974 | Frost | Aug. 31, 1897 |
| 1,369,008 | Christen | Feb. 22, 1921 |
| 1,452,415 | Cmejla | Apr. 17, 1923 |
| 1,874,790 | Mortenson | Aug. 30, 1932 |
| 2,195,967 | Liebmann | Apr. 2, 1940 |
| 2,382,340 | Smith | Aug. 14, 1945 |
| 2,540,603 | Urbain | Feb. 6, 1951 |
| 2,662,746 | Jorn | Dec. 15, 1953 |
| 2,710,175 | Jorn | June 7, 1955 |
| 2,718,383 | Frenger | Sept. 20, 1955 |
| 2,782,006 | Frenger | Feb. 19, 1957 |